Aug. 1, 1939.     A. AUGER     2,168,187

APPARATUS FOR FORMING GAS-LIQUID EMULSIONS

Filed Feb. 7, 1936     3 Sheets-Sheet 1

INVENTOR
A. Auger
By Lacy & Lacy
Attys

Aug. 1, 1939.   A. AUGER   2,168,187
APPARATUS FOR FORMING GAS-LIQUID EMULSIONS
Filed Feb. 7, 1936   3 Sheets-Sheet 2
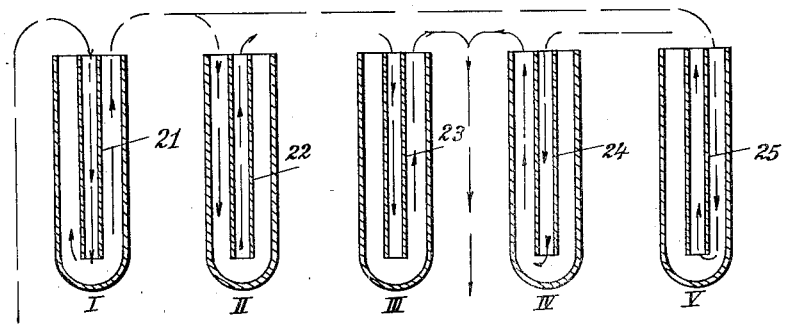
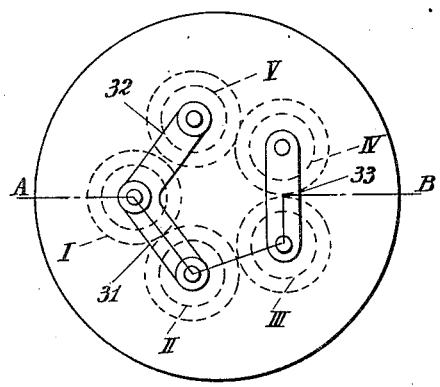
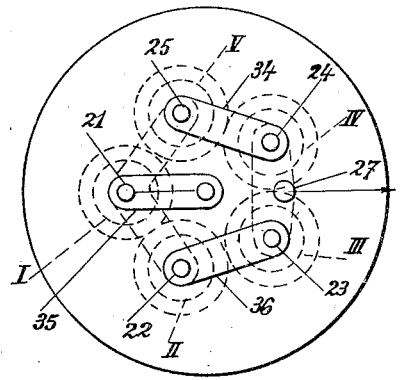
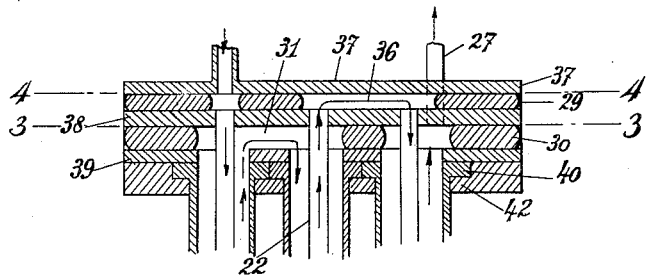
INVENTOR
A. Auger.
By Lacey & Lacey,
Attys Aug. 1, 1939. A. AUGER 2,168,187
APPARATUS FOR FORMING GAS-LIQUID EMULSIONS
Filed Feb. 7, 1936 3 Sheets—Sheet 3
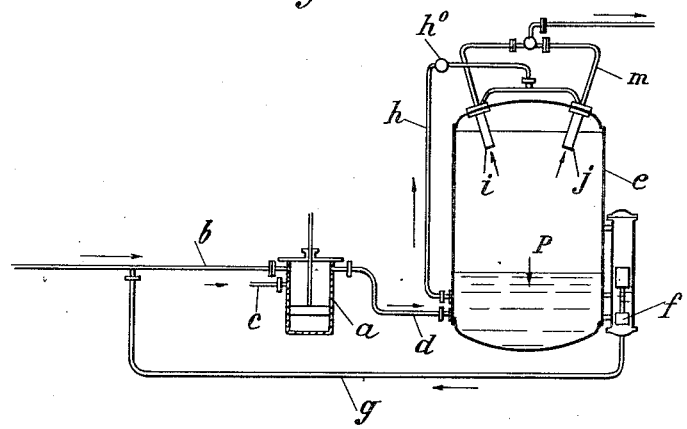
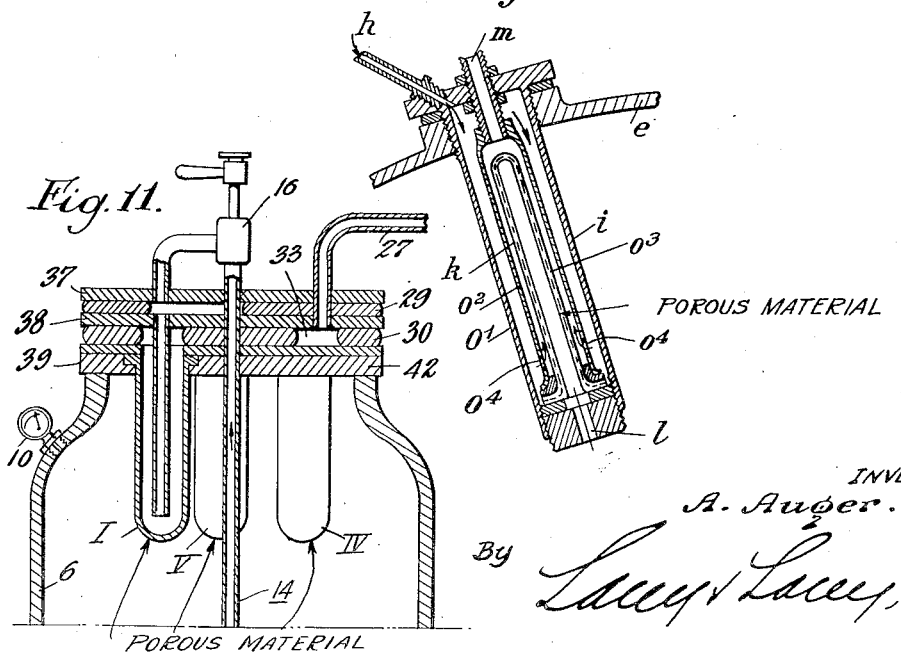

Patented Aug. 1, 1939

2,168,187

UNITED STATES PATENT OFFICE 2,168,187

APPARATUS FOR FORMING GAS-LIQUID EMULSIONS

Adrien Auger, Ville d'Avray, France, assignor to Société a Responsabilité Limitée Osmo, Paris, France Application February 7, 1936, Serial No. 62,868
In France February 8, 1935

6 Claims. (Cl. 261—122)

The invention relates to an apparatus for the continuous production under pressure of an emulsion of liquid and gas.

According to the invention, the liquid and gas are forced under the same pressure into a tank and this pressure is used for causing the liquid to flow along one side of a porous element or porous elements and causing the gas to diffuse through the porous elements into the liquid without the interposition of any mechanical member.

The tank communicates through a conduit with a second tank, said conduit leading the liquid from the lower part of the first tank along one side of a porous element or porous elements, the other side of which communicates with the gas under pressure in the upper part of the first tank.

When emulsion is drawn off from the second tank, causing the pressure therein to drop, liquid will flow from the first tank through the conduit to the second tank and, provided the pressure loss of the liquid on its way from the first tank to the porous elements is greater than the pressure necessary for forcing the gas through the porous elements, the gas from the upper part of the first container will diffuse through the porous elements into the flowing liquid and emulsify the same.

A valve may be provided for regulating the pressure loss and the rate of flow of the liquid from the tank to the porous element or elements.

The apparatus according to the invention is adapted to produce numerous kinds of emulsions for various applications, such, for instance, as emulsified heavy oils for feeding burners.

In some cases, such as in the production of aerated beverages, where it is desired to cause the gas to be absorbed by the emulsified liquid, a column containing glass balls or glass waste will be interposed in the conduit between the porous elements and the second tank so as to facilitate this absorption under pressure, the gas in excess being returned to the supply circuit through a check valve adjusted so as to open at a pressure depending on the desired gas content of the beverage.

The first tank is provided with a contact stopping the motor of the plant when the liquid level in this tank reaches a predetermined height.

The following specification, with reference to the accompanying drawings, given by way of example only, will allow one to clearly understand how the invention can be carried out.

Fig. 1 is a diagrammatic view of a form of construction of the apparatus.

Fig. 2 diagrammatically shows the circulation of the liquid and its distribution within porous elements in the case of a device comprising five porous elements arranged in parallel circuits.

Fig. 3 is a horizontal sectional view on the line 3—3 of Fig. 5.

Fig. 4 is a sectional view on the line 4—4 of Fig. 5.

Fig. 5 is a section made according to broken line A—B of Fig. 3.

Fig. 9 is a modification of the apparatus.

Fig. 10 is a section, on an enlarged scale, showing the mode of assemblage of a porous element of this modified form of apparatus.

Figure 11 is an enlarged sectional view showing in detail the tubes of porous material so that it may be better understood how the invention operates.

Figure 1:
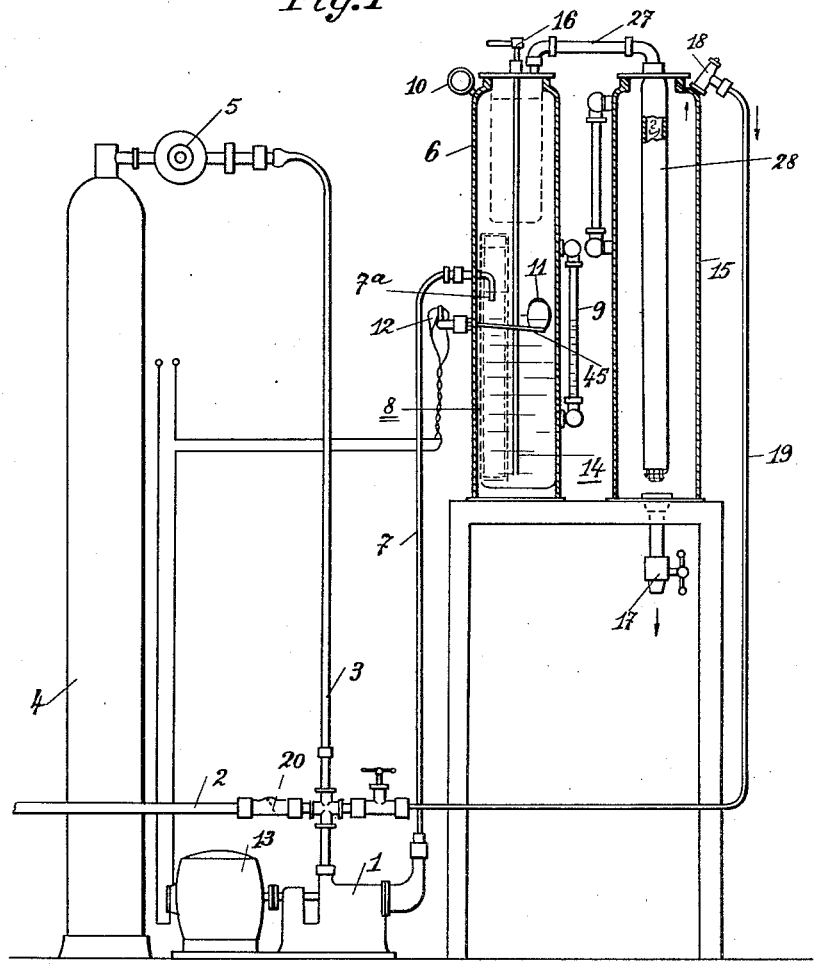

In the form of construction illustrated in Figs. 1 to 8, the plant comprises a pump 1, supplied with liquid by a conduit 2, and with gas by a conduit 3.

When the gas is taken from a cylinder 4 containing the gas under pressure, a pressure reducer 5 is mounted between the cylinder 4 and the conduit 3.

The mixed gas and liquid are led to the tank 6 by a pipe 7 and a nozzle 7a provided with a foam collecting sieve 8.

The level of the liquid is observed by means of a gauge glass 9 and the pressure by means of a pressure gauge 10.

A float 11 actuating a mercury switch 12 connected to the circuit of the motor 13 actuating the pump 1 stops the supply at a definite level.

According to the principle of communicating vesses, the liquid is drawn from tank 6 by a tube 14.

A needle valve 16 allows of limiting the liquid output relatively to the gas output which depends only on the area of the porous circuit, on its nature, and on the difference of pressure which takes place between tank 6 and tank 15 when the emulsion is drawn off from the latter through a cock 17.

A check valve 18, so adjusted as to act at a pressure lower than the supply pressure of the tank 6 allows the recovery of the gas in excess through a pipe 19, of small output, which returns the gas in excess to the pipe line 3.

A check valve 20 prevents the delivery of this gas in to the liquid pipe line 2.

The tank 15 being put in circuit, that is to say in communication with the apparatus of utilization, (for instance a burner) if a fuel oil emulsion is under consideration, or with a bottle filling apparatus if an aerated drink is under consideration, a partial vacuum is created in one tank relatively to the other, this causing suction of the liquid through the tube 14 and of the gas through the pores of the porous elements, and the emulsion is thus formed in a continuous manner. The porous elements having a given surface and permeability, the passage of the gas depends on the pressure in the tank 6. The flow of liquid is controlled by the vave 16.

This passage will be optimum when there will no longer be excess of gas in the upper part of tank 15.

Exact equilibrium being difficult to obtain, it is ajustable to operate with a slight excess of gas, the surplus beng drawn off by the overflow valve 18. The valve 18 returns to the pump 1 the gas which has not been dissolved in the liquid or incorporated in the latter in fine bubbles. This feature is important for instance, in the production of a fuel oil emulsion for burners.

Owing to the gauging of the piping 19 in order that it should be just sufficient for a small gas output, the apparatus cannot operate in closed circuit, in fact, as this piping has an insignificant output relatively to the output of the pump supplied by 2, if tank 15 no longer delivers towards the exterior, the level in tank 6 rapidly rises to the height where, through flat 11 and switch 12, the motor actuating the pump is stopped.

Figure 6:
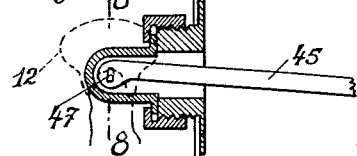
Fig. 6 is a section showing the fluid-tight assemblage of the axial pin of a mercury electric contactor, the section being made at right angles to this axial pin and the contactor being illustrated in closed position.
Figure 7:
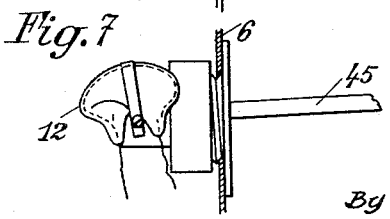
Fig. 7 shows the contactor in open position.
Figure 8:
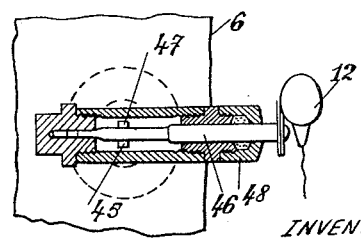
Fig. 8 is a section made on the line 8—8 of Fig. 6.

Figs. 6, 7 and 8 illustrate the mode of fitting up the switch 12 at the end of the arm 45 of float 11.

The switch arranged outside tank 6, as shown in Fig. 1, is rigid with a pin 46 on which is secured, by means of a joint 47, the arm 45 of float 11. A stuffing box 48 ensures fluid-tightness.

The liquid leaving the tank 6 through the pipe 14 flows along one of said porous elements, as shown in Figs. 2, 3, 4 and 5. Only gas flows through the porous elements. The porous elements shown in Figs. 2 and 5 are mounted in the upper gas containing part of the tank 6. The plates 42, 39, 38, 29 and 37 form the cover of sair tank. In Fig. 1, the porous elements are only diagrammatically shown by the dotted lines depending from the cover of the tank 6. The outer walls I, II, III, IV, V, in Fig. 2, of said elements, are porous.

Figs. 2 to 5 illustrate the arrangement of a plurality of porous elements in series parallel. In the example described, these porous elements of substantially candle-like shape, are five in number. It will be seen in Fig. 2, that the liquid coming from tank 6 through pipe 14 moves down through a tube 21 within the porous element 1, through the wall of which the gas passes. The liquid already emulsified coming from this porous element moves down within the two porous elements II and V arranged in parallel where it receives a further quantity of gas.

From the porous element II, the liquid passes, through the tubes 22 and 23, to the porous element III, and from the porous element V, it passes, through tubes 25 and 24, to the porous element IV. From these porous elements III and IV, it finaly passes through an outlet 33, in a tube 27 communicating with a column 28 filled with glass balls or glass waste and opening in tank 15.

The distribution of the liquid in the various porous elements I through V is ensured by two plates 29, 30 provided with slots or grooves such as 31 to 36 causing the various porous elements to communicate together, these superposed plates, alternating with disks 37, 38, 39 which ensure the closing of the passages for the liquid, which is to say, that the disks separate the different passages from one another and from the exterior so as to avoid leakage and compel the liquid to follow the correct path. The flow of liquid is, of course, not interrupted by said disks. The passages are constituted by the slots or grooves 31 to 36. These disks can, for instance, be made of resilient material, such as rubber, and they are clamped against the plates and against the flanges 40 of the porous elements by any suitable means, fluid-tightness being ensured by rubber packings 42 compressed by the clamping flange.

It is obvious that modifications of detail can be made in the arrangements which have just been described without departing thereby from the scope of the present invention.

Thus, when the gas is taken from pressure gas cylinders and when the liquid is also available under pressure as, for instance, the water from the water conduit, the pump can be dispensed with, provided the pressure of the gas and liquid is sufficiently high to establish the necessary flow from the tank 6 to the tank 15 and from there to the point of utilization of the emulsion.

In this case, the equilibrium must be maintained as exactly as possible, as otherwise recovery becomes impossible.

For that purpose, the tank will be supplied with liquid at the pressure P directly reaching the tank, the gas being regulated at a slightly higher pressure will be admitted only from the maximum level of the liquid through a valve controlled by a float.

The pressure will therefore always be maintained between that of the gas admitted at the maximum level, and that of the water which is assumed to be constant. It will be sufficient to adjust the passageway of the needle valve 16 in order that the outflow of the liquid and gas should be maintained in proportions lower than that of saturation.

An apparatus of this type provided with a gas inlet valve controlled by a float can also operate with a liquid pump of small output, when the liquid is not directly delivered under pressure. In this case, it would be suitable for small saturating plants for aerated drinks.

For portable plants, instead of a pressure created by a pump, a pressure produced by means of a compressed gas cylinder can be employed.

In the modification shown in Figs. 9 and 10, the plant comprises a pump $a$ supplied with liquid by a conduit $b$, and with air or gas by a conduit $c$. This pump delivers the gas and liquid, through a conduit $d$, into a tank $e$.

The level of the liquid in tank $e$ is maintained constant by a flood gate valve $f$ and the excess of liquid is returned, through a conduit $g$, to the supply circuit $b$.

Under the gas pressure P existing in tank $e$, the liquid is sent, through a conduit $h$ provided with a needle valve $h^0$ around a series of porous elements $i, j$; each porous element is fitted in a tube having a double wall $o^1$, $o^2$ and screwed in the top of the tank.

Inside the inner tube $o^2$ is fitted a tubular porous element $o^3$ having an open end which communicates through a conduit $l$ with the gas in the tank $e$. The tube wall $o^2$ is perforated at $o^4$.

In Figure 11 of the drawings there is shown an enlarged sectional view which discloses the manner in which the various tubes are mounted with respect to the porous elements I through V. In other words, it will be clearly seen how the liquid circulates about the porous elements and how the gas is caused to be intimately mixed with the liquid for producing the emulsion.

The liquid circulates about the porous elements in the space $k$ whilst the gas of tank $e$ enters the porous elements through a conduit $l$ the emulsion produced by the intimate mixture of the liquid circulating at $k$ and of the gas under pressure, which diffuses through the pores of the porous elements, is led, by a conduit $m$, to the point of utilization.

Having thus described the invention, what I claim is:

1. An apparatus for the continuous production under pressure of an emulsion of liquid and gas, comprising a tank, means for forcing a mixture of liquid and gas under pressure into said tank to establish a liquid level therein, at least one porous element in communication with the space above the liquid level in the tank, means for establishing a flow of liquid from said tank along one side of the porous element, and the pressure being such that the gas from said tank diffuses through said porous element into the liquid flowing past said porous element.

2. An apparatus as claimed in claim 1, comprising a valve for regulating the rate of flow of the liquid from the tank to said porous element.

3. An apparatus as claimed in claim 1, comprising a float mounted in said tank and means operable by said float so as to interrupt the liquid and gas supply when the liquid level in said tank rises above a predetermined height.

4. An apparatus as claimed in claim 1, comprising a second tank, means for leading the emulsion from said porous element into said second tank, means for drawing emulsion from said second tank, and a tube filled with glass pieces through which the emulsion passes on its way from the porous element to the second tank.

5. An apparatus as claimed in claim 1, comprising a second tank, means for leading the emulsion from said porous element into said second tank, means for drawing the emulsion from said second tank, a return valve mounted in the upper part of said second tank, and a return conduit leading from said return valve to said means for forcing liquid and gas into the first mentioned tank.

6. An apparatus as claimed in claim 1, comprising a plurality of porous elements through which the liquid passes in series.

ADRIEN AUGER.